Apr. 3, 1923.
R. L. STINCHFIELD
1,450,522
LENS SHADE
Filed Dec. 12, 1921
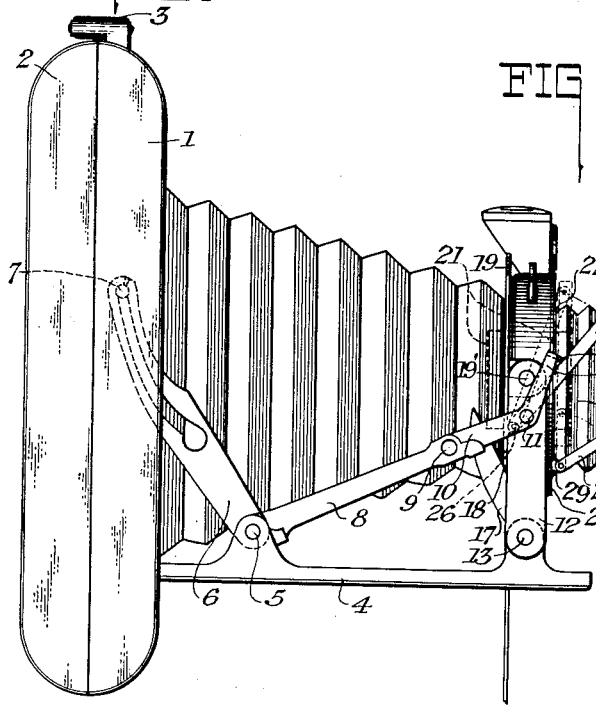
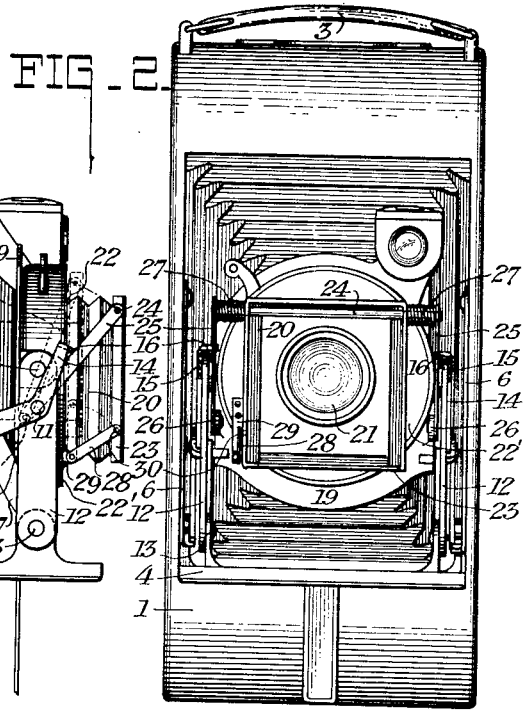
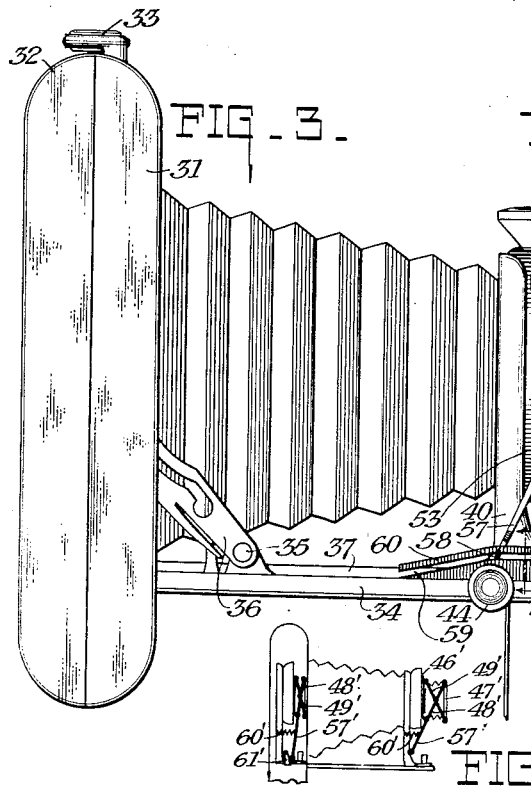
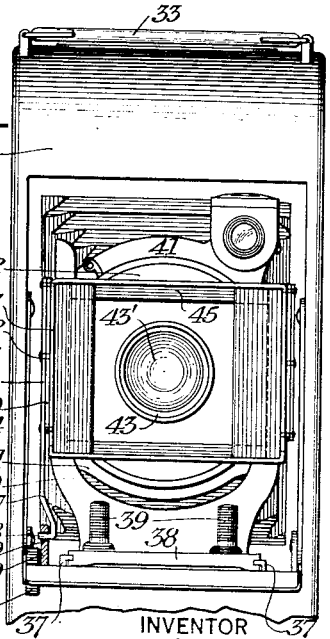
INVENTOR
Ray L. Stinchfield,
BY
*[signature]*
ATTORNEY Patented Apr. 3, 1923.

1,450,522

UNITED STATES PATENT OFFICE.

RAY L. STINCHFIELD, OF ROCHESTER, NEW YORK, ASSIGNOR TO EASTMAN KODAK COMPANY, OF ROCHESTER, NEW YORK, A CORPORATION OF NEW YORK.

LENS SHADE.

Application filed December 12, 1921. Serial No. 521,898.

*To all whom it may concern:*

Be it known that I, RAY L. STINCHFIELD, a citizen of the United States of America, residing at Rochester, in the county of Monroe and State of New York, have invented certain new and useful Improvements in Lens Shades, of which the following is a full, clear, and exact specification.

This invention relates to photography and more particularly to lens shades for cameras, and has for its object to provide a simple, compact, and durable device of this kind which can be applied to standard types of cameras. To these ends the improvements are directed particularly to the means for automatically erecting the lens shade as the objective of the camera is moved to its picture taking position; to means for automatically folding the shade as the lens is retracted from its picture taking position; to the construction of a shade which can be folded into compact cameras; and to operating mechanism between the camera and the shade by which the latter is moved without attention from an operator. With these and other objects in view, the invention consists in certain improvements and combinations of parts, all as will be hereinafter more fully described, the novel features being pointed out in the claims at the end of the specification.

In the drawings, in which like reference characters denote like parts throughout:

Fig. 1 illustrates a side elevation of a camera equipped with a lens hood constructed in accordance with and illustrating one embodiment of my invention;

Fig. 2 is a front elevation of the same camera and shade shown in Fig. 1;

Fig. 3 is a side elevation of another form of my invention applied to a different type of camera;

Fig. 4 is a front elevation of the device shown in Fig. 3 with a small part in section (on line 4—4 of Fig. 3;) and Fig. 5 is a diagrammatic view of a still different application of my invention.

In Figs. 1 and 2 I show my invention applied to a camera of the "self erecting" type such as is shown in U. S. Patent No. 1,380,810, Kroedel, June 7, 1921, wherein a camera body 1 is provided with a removable back 2, handle 3, and folding bed 4. To each side of the bed 4 is pivoted at 5 a bed brace 6, having a sliding connection with the camera body about a stud 7. Extending forwardly from the pivot 5 is a jointed bracing arm formed of a long section 8 pivoted at 9 to a short section 10, which is pivoted at 11 to an upright 12, this part being hinged at 13 to the bed. Section 10 has an operating end 14 extending beyond and above the end of the upright 12, there being a roughened portion 15 which may be pressed to break the joint of the bracing arm, to close the camera. On the end of the section 14 there is an inwardly extending lug 16 to contact with a portion of the shade operating mechanism as will be hereinafter described. A finger 17 engages a lug 18 of the lens board 19 to hold it erect, as is fully described in the above described patent. The lens board is pivoted at 19' to upright 12. A similar mechanism is used on the other side of the bed. All of the construction so far described is known.

Coming now to my invention, the lens shade 20 is mounted to surround the objective 21 upon the lens carrier. This term is used to embrace all of the parts used to carry the lens as the shutter, the lens board, or the lens barrel in the type shown in Figs. 1 and 2. A frame 22 carries the rear of the bellows-like shade 20, being attached to the shutter 22', and a second frame 23 supports the outer end of the bellows. A shaft 24 carries the frame 23 and is supported by links 25—25 which are pivotally attached at 26—26 to the lens board 19. Springs 27—27 tend to turn these links about their pivots to close the shade, or to fold it against the shutter. When the camera is open the lugs 16—16 contact with these links, holding them against spring pressure, as shown in Fig. 1. It should be noted here that in the erecting movement after lugs 16—16 first come in contact with links 25—25 there is a sliding movement between these parts as the lugs and links move about their respective axes, and the links are moved against the pressure of springs 27 until the shade is erect. Thus a portion of the energy exerted in opening the camera is, in this form of my invention, directed to or utilized in opening the shade. In order to keep the bottom on frame 23 from tilting toward the shutter, I provide a short link 28, pivoted at one end to a plate 29 carried by the shutter and pivoted at the other end 30 to the frame 23. The pivotal points are arranged on the lens carrier to make the frame parallel to the shutter when open and when closed (dashed lines, Fig. 1.)

With this camera it is only necessary to draw down the bed 4 to project the objective to its picture taking position through the action of braces 6, 8, 10, and fingers 17. The part of the erecting movement which causes the ends 16 of links 9 to pass over the top of uprights 12 erects the shade by contacting with supporting links 25, turning them against the action of springs 27 and causing frame 24 to swing upon links 25—25 and link 28 to the erect position. I find a single link 28 all that is necessary, although, of course, one could be placed on each side if symmetry of design is desired.

I contemplate providing a shade of this type as an attachment which can be readily applied to cameras on the market. A camera of the type shown in the Kroedel patent could be equipped with my shade by slightly altering the shape of the closing levers (14 in this drawing) by bending the ends of the levers, and then fastening the several parts of the shade in the proper position.

In Figs. 3 and 4 I have illustrated my invention as applied to a well known type of folding camera of the type wherein the bed is lowered and the objective carriage is manually drawn out on a track on the bed into its picture taking position. The camera body 31, has a removable back 32, handle 33, bed 34, and bed braces 36 hinged to the bed at 35. There is a track 37 on the bed on which the carriage 38 travels when drawn by the finger grips 39. The lens carrier in this camera comprises a yoke 40 supporting a lens board 41, a shutter 42, and an objective mount 43. An objective 43′ is carried by the mount. A pinion 44 is for moving the objective for focusing. The lens shade 45 is carried by frames 46 and 47, the former being fastened to the shutter. Cross links 48 and 49 keep the frames parallel, being pivotally connected at 50 and 51 to the frames and at 52 to each other. Pins 53 and 54 on the links extend into slots 55 and 56 in the frames permit a sliding connection. Link 48 has an extended arm 57 with a turned foot 58 engaging cam slot 59 in plate 60 attached to the bed 34. As the objective is moved from the infinity position (Fig. 3) forwardly by pinion 44 to focus, the relation of the links remains constant as the slot 59 is parallel with the bed. But as the camera 38 is moved rearwardly by handles 39 the cam lowers the foot 58, thus bringing frames 46 and 47 together and closing the shade. The reverse is true as the carriage is drawn out. In this form no springs are used, and as the parts are of light construction very little of the energy used in drawing out the objective is required for the erection of the shade. This structure can be readily applied to cameras now on the market.

In Fig. 5 a diagrammatic figure represents a hood spring pressed open. When applied to a camera of the type shown in Fig. 3 the shade construction is the same, except that the foot 58 is not used on the extended arm 57′ of the links 48′. A spring 60′ normally draws in on arm 57′, thus normally erecting shade 45′. When the carriage 38′ is moved inwardly to close the camera, arm 57′ strikes a lug 61′ and farther inward movement causes links 48′ and 49′ to bring frames 46′ and 47′ together, thus automatically folding the shade. As the camera is opened by drawing out the carriage spring 60′ erects the shade as arm 57′ leaves lug 61′. In this type a small portion of the energy used in closing the camera is required to overcome the tension of spring 60′.

In the drawings I have illustrated my automatically erecting hood as applied to several types of cameras and as being spring pressed open, spring pressed closed, and operable without springs. It is obvious that many changes can be made without departing from the principle of my invention.

Having thus described my invention, what I claim as new and desire to secure by Letters Patent is:

1. A folding camera comprising a camera body, a photographic lens carrier movable to extended and retracted positions relative to said body, a lens shade on said carrier movable into and out of lens-shading position, and means for automatically moving said shade into and out of said shading position upon movement of said lens carrier to said extended and retracted positions.

2. A folding camera comprising a camera body, a photographic lens carrier movable to extended and retracted positions relative to said body, a lens shade on said carrier movable into and out of lens-shading position, and means for automatically moving said shade out of said shading position upon movement of said lens carrier to said retracted position.

3. A folding camera comprising a camera body, a photographic lens carrier movable to extended and retracted positions relative to said body upon the application of energy to said carrier, a lens shade movable into and out of lens-shading position, and means for directing a part of said energy to move said shade into one of its said positions.

4. A folding camera comprising a camera body, a photographic lens carrier movable from extended to retracted position relative to said camera body, a lens shade on said camera movable into and out of lens-shading position, means for moving said shade out of lens-shading position and a device for controlling said means upon movement of said carrier to retracted position.

5. A folding camera comprising a camera body, a photographic lens carrier movable toward and from said body, a camera part, said part and said carrier having relative movement, a lens-shade on said carrier having a movable member, and connections between said part and said member for moving said member upon relative movement of said part and carrier.

6. A folding camera comprising a camera body, a bed hinged on said body, a photographic lens carrier movable toward and from said body, a lens-shade on said carrier movable into and out of lens-shading position, and connections between said bed and shade for moving said shade to one of its said positions upon the swinging of said bed about its hinge.

7. A folding camera comprising a camera body, a photographic lens carrier movable toward and from said body, a camera part, said part and said carrier having relative movement, a lens-shade on said carrier having a movable member, and connections between said part and said member for moving said member upon relative movement of said part and carrier, said connections including driving and driven elements one sliding on the other.

8. A folding camera comprising a camera body, a bed hinged on said body, a photographic lens carrier movable toward and from said body, a lens-shade on said carrier movable into and out of lens-shading position, and connections between said bed and said member for moving said shade to one of its said positions upon the swinging of said bed about its hinge, said connections including driving and driven elements one sliding on the other.

9. As an article of manufacture a movable lens-shade adapted to be attached to the photographic lens carrier of a folding camera having a part with respect to which said carrier is relatively movable, said lens-shade including a member movable to bring said shade into and out of shading position and a driving device for said member adapted to connect with said camera part during relative movement between said part and carrier.

Signed at Rochester, New York, this 9th day of December, 1921.

RAY L. STINCHFIELD.